Nov. 30, 1926.  
W. C. NABORS  
1,608,660  
TRAILER ATTACHMENT FOR VEHICLES  
Filed Oct. 30, 1925  2 Sheets-Sheet 1
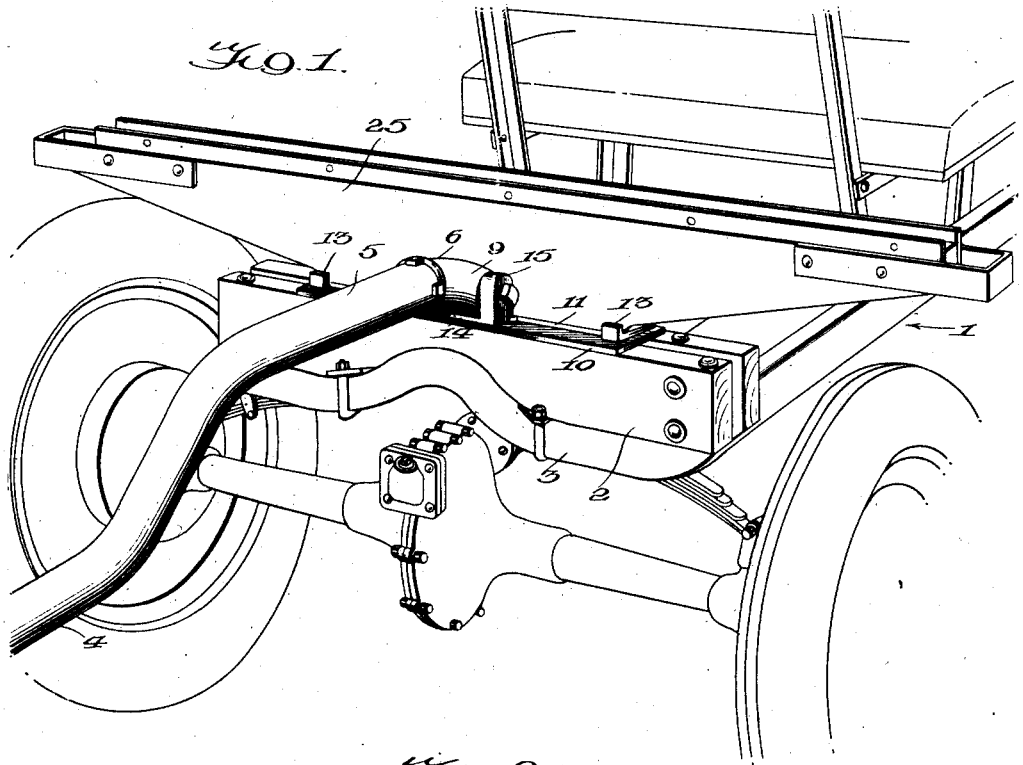
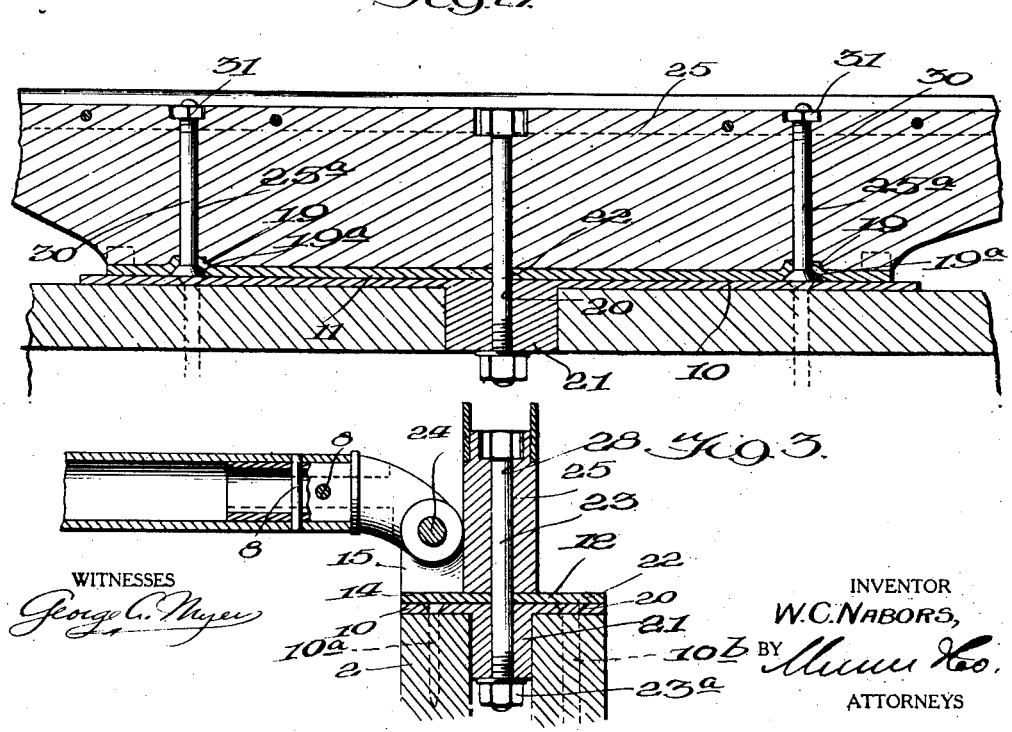
WITNESSES  
INVENTOR  
W.C. NABORS,  
BY  
ATTORNEYS Nov. 30, 1926.
W. C. NABORS
1,608,660
TRAILER ATTACHMENT FOR VEHICLES
Filed Oct. 30, 1925    2 Sheets-Sheet 2
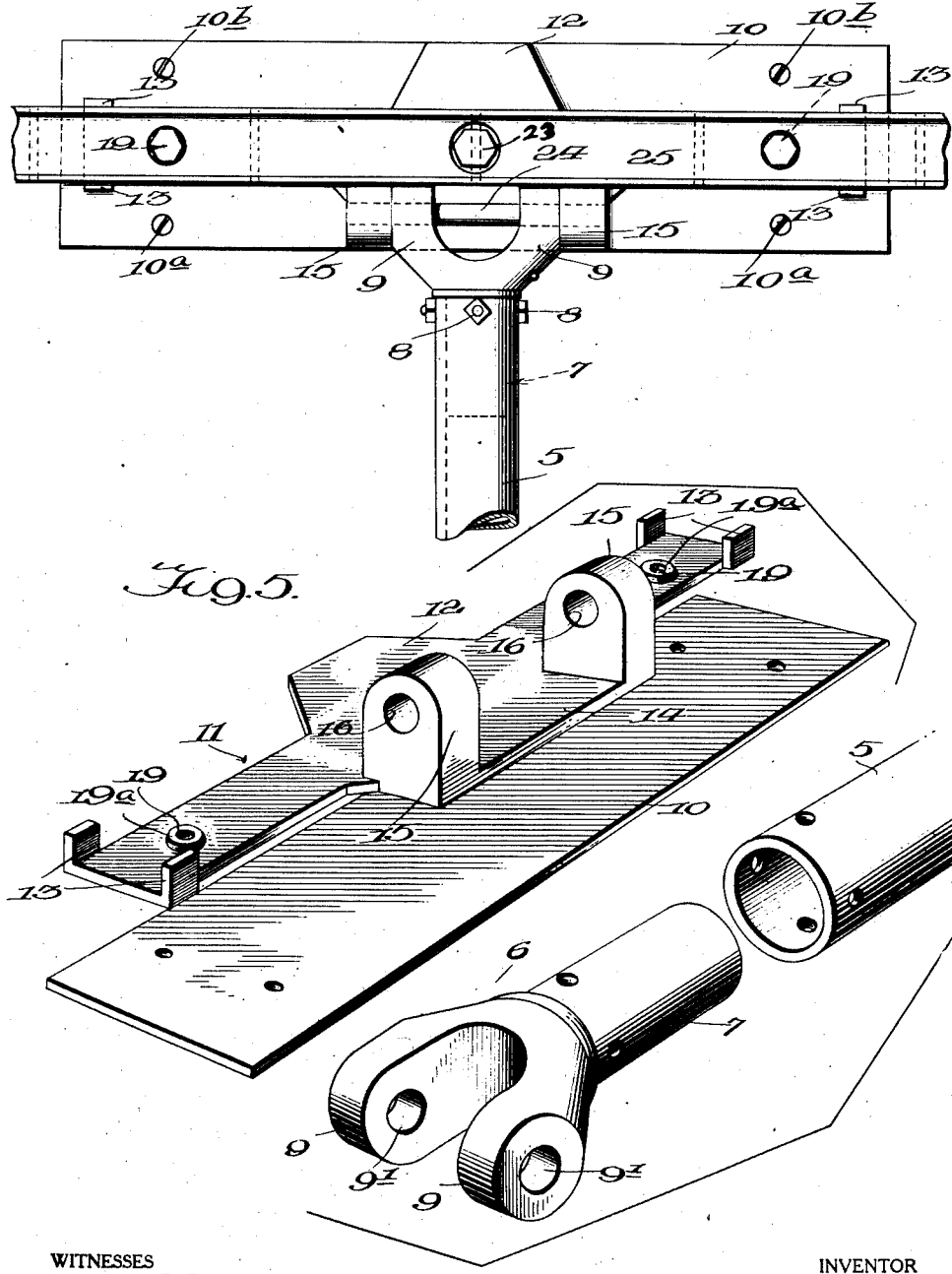
WITNESSES
INVENTOR
W.C. NABORS,
BY
ATTORNEYS Patented Nov. 30, 1926.

1,608,660

UNITED STATES PATENT OFFICE.

WILLIAM CAMPBELL NABORS, OF MANSFIELD, LOUISIANA.

TRAILER ATTACHMENT FOR VEHICLES.

Application filed October 30, 1925. Serial No. 65,814.

My invention relates to improvements in trailer attachments for vehicles, which consists in combinations, constructions and arrangements herein described and claimed.

An object of the invention is the provision of simple, reliable and efficient means for attaching the reach pole of a trailer to the rear bolster of the leading truck, so that the reach pole of the trailer can swing both vertically and horizontally relatively to the part of the leading vehicle with which it is attached.

A further object of the invention is the provision of an attachment of the character described which affords facilities for engaging with the load supporting member or bunk that is disposed at the rear of the leading vehicle for co-operating with the trailer to support a load of logs or other elongated objects so that the reach pole and the load supporting member at the rear of the leading vehicle will swing horizontally as a unit about the same vertical axis and therefore the load that is partly supported on the trailer and partly on the load supporting member at the rear of the leading vehicle will be securely supported in a uniform manner irrespective of the angular relation of the longitudinal axis of the reach pole to the longitudinal axis of the leading vehicle as well as when the trailer is moving directly in line with the leading vehicle.

A further object of the invention is the provision of a trailer attachment of the character described which can be attached to a leading vehicle with but slight, if any, changes being required in the latter.

Other objects and advantages of the invention will be apparent from the following description considered in conjunction with the accompanying drawings, in which:—

Figure 1 is a perspective view, showing the improved trailer attachment applied to the rear end of a vehicle, Figure 2 is a fragmentary longitudinal section through the rear bolster and the transverse bunk of the leading vehicle, as well as the parts of the attachment which are disposed between the rear bolster and bunk of the leading vehicle, Figure 3 is a fragmentary vertical section taken at right angles to Figure 2, showing the means for attaching the reach pole of the attachment to the rear bolster;

Figure 4 is a plan view of the structure as shown in Figure 3, and

Figure 5 is a relatively enlarged perspective group view of certain elements of the trailer attachment, the bolts for connecting the sections of the reach pole to each other being omitted.

In Figure 1, the numeral 1 generally designates an automotive vehicle. The vehicle includes a rear bolster 2 which is secured on the rear transverse member 3 of the body or frame of the vehicle.

The invention provides a reach pole which is offset upwardly for part of its length adjacent to the forward end thereof as indicated at 5. The reach pole is only partly illustrated in the drawings, the rear end portion thereof being omitted as well as any illustration of a trailer truck, since it will be understood from the description that will follow that the rear end portion of the reach pole may have any suitable known structure and may be attached to a trailer truck in any suitable known manner. The body of the reach pole is tubular in form. The reach pole also includes an attaching section 6 at the forward end thereof which comprises a tubular portion 7 adapted to fit in the forward end portion of the upwardly offset part 5 of the reach pole body and to be rigidly secured to the body of the reach pole by fastening devices such as the bolts 8 which are projected through alined openings in the lapped portions of the offset portion 5 of the body of the reach pole, and the attaching section 6 of the reach pole. A head 7 of the attaching section 6 of the reach pole is merged at its forward end into a pair of spaced ears 9 which are offset laterally in opposite directions from the axial line of the portion 7 of the attaching section 6 of the reach pole. The ears 9 curve forwardly and downwardly and are apertured adjacent to their extremities by alined transverse openings 9'. These openings 9' therefore are located below the axial line of the portion 7 of the attaching section 6 of the reach pole.

A substantially flat bearing plate 10 is superimposed on the middle portion of the bolster 2 of the vehicle 1 and preferably has a width equal to that of the underlying portions of the bolster 2. This bearing plate 10 may be held against movement on the bolster 2 by the screws 10ᵃ and the fastening devices indicated at 10ᵇ. The plate 10 also has a pendent boss 21 which fits snugly between longitudinal sections of the bolster 2 and aids in staying the plate 10 to the bolster 2.

An attaching plate 11 is of less width than the bearing plate 10 for a greater part of its length and has a smooth plane lower face adapted to rest flatwise on the bearing plate 10. The attaching plate 11 is extended laterally intermediate its ends as indicated at 12 for part of its length, the side edges of this extension 12 being beveled as best seen in Figure 5, so that the extension decreases in width toward its outer end. The body of the attaching plate 11 also is formed with pairs of transversely alined upwardly and outwardly extending lugs 13 at the opposite ends of the attaching plate for purposes to be presently described. The body of the attaching plate 11 also is formed with a lateral extension 14 intermediate the ends of the body of the attaching plate and opposite the lateral extension 12. The extension 14 is enlarged upwardly at its opposite ends to provide a pair of upstanding ears 15 which have aligned horizontal openings 16 formed therein. The end portions of the body of the attaching plate 11 also are formed with upstanding bosses 19 which are located intermediate the side edges of the body of the attaching plate 11. Vertical openings 19ᵃ in the plate 11 extend through the bosses and are enlarged at their lower ends.

The bearing plate 10 is formed with a central opening 20 which extends vertically through the boss 21. The attaching plate 11 then is superimposed on the bearing plate 10 with the extension 12 at the forward side of the attaching plate and with an opening 22 that is formed in the plate 11 in alinement with the opening 20. It is obvious that the attaching plate 11 will be connected with the bolster 2 to swing about a vertical axis when a vertical pivot pin 23 is disposed in the alined openings 22 and 20, as best seen in Fig. 3. With this arrangement, the extension 14 will be disposed at the rearward side of the attaching plate. The forward end of the reach pole then is disposed between the ears 15 so that the openings 9′ in the horizontally spaced ears 9 of the attaching head section of the reach pole are in alinement with the openings 16 in the ears 15, and a horizontal element 24 is projected through the alined openings 16 and 10 in the ears 15 and 0. The reach pole thus will be connected with the attaching plate 11 to swing about a horizontal axis and in consequence, the reach pole is permitted to swing both horizontally and vertically relatively to the bolster 2.

A transverse supporting member or bunk is indicated at 25 and is adapted to be supported on the vehicle 1 at the rearward end of the latter for co-operating with a similar bunk, not shown, on the truck of the trailer to support a load of logs of like elongated members. The bunk 25 has cavities in the lower face thereof for the reception of the upstanding portions 19, on the attaching plate 11. The bunk has a vertical opening 28 in line with the openings 20 and 22. The pivot element 23 is a bolt of sufficient length to extend through the aligned openings 28, 22 and 20. The lower end of this bolt 23 is engaged by a nut 23ᵃ. The end portions of the bunk are formed with vertical openings 25ᵃ in line with the openings 19ᵃ in the plate 11. Bolts 30 extend through alined openings 19ᵃ—25ᵃ and have their upper end portions engaged by nuts 31. The heads of the bolts 30 are received in the enlarged lower end portions of the openings 19ᵃ and the nuts 31 and the upper end portions of the bolts are received in enlarged upper end portions of the openings 25ᵃ.

The members of the pairs of upstanding lugs 13 are adapted to straddle the lower edge portion of the bunk 25, whereby the bunk 25 will be held against bodily horizontal movement relatively to the attaching plate 11 when the bunk 25 has been superimposed on the attaching plate 11. Therefore, swinging movement of the attaching plate 11 about the axis of the vertical pivot pin 23 will cause a like movement of the bunk 25 and the bunk 25 and the reach pole 4 therefore are connected to swing as a unit horizontally.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A trailer attachment for vehicles comprising an attaching plate adapted to be superimposed on a rear transverse member carried by the vehicle, means connecting the attaching plate to the rear transverse member of the vehicle so that said attaching plate can swing about a vertical axis, a reach pole, means connecting the forward end of the reach pole to said attaching plate to swing about a horizontal axis, and lugs on said attaching plate for engaging with an adjacent movable member of said vehicle.

2. A trailer attachment for vehicles having a rear bolster, said attachment comprising an attaching plate, means connecting the attaching plate with the bolster so that said attaching plate can swing about a vertical axis, a reach pole, means connecting the forward end of the reach pole with said attaching plate so that the reach pole can swing about a horizontal axis, and means on said attaching plate for engaging with a transverse load supporting member to prevent horizontal fore-and-aft movement of the horizontal load supporting member relatively to said attaching plate when said load supporting member is superimposed on said attaching plate.

3. The combination with a vehicle having a rear bolster, of a bearing plate superimposed on said bolster, an attaching plate superimposed on the bearing plate, the attaching plate and the bearing plate having vertically alined openings, a vertical pivot pin disposed in said vertically alined openings in the attaching plate and the bearing plate a rearward extension on said attaching plate intermediate the ends of the attaching plate, said rearward extension having an upstanding ear provided with a horizontal transverse opening, a reach pole having a transverse opening in the forward end portion thereof, and a horizontal pivot arm projected through the openings in said upstanding ear and the horizontal opening in the forward end portion of the said reach pole for connecting said reach pole with said attaching plate so that said reach pole can swing vertically.

4. The combination with a vehicle having a rear bolster of a bearing plate secured on said bolster, an attaching plate superimposed on the bearing plate, said bearing plate having a boss depending between the sections of the bolster, the attaching plate and the bearing plate having vertically alined openings, the opening in the bearing plate extending through the pendent boss thereon, a vertical pivot pin disposed in said vertically alined openings in the attaching plate and the bearing plate, a rearward extension on said attaching plate intermediate the ends of the attaching plate, said rearward extension having an upstanding ear provided with a horizontal transverse opening, a reach pole having a transverse opening in the forward end portion thereof, and a horizontal pivot arm projected through the openings in said upstanding ear and the horizontal opening in the forward end portion of the said reach pole for connecting the reach pole with said attaching plate so that said reach pole can swing vertically, the forward end portion of said reach pole being offset upwardly.

5. The combination with a vehicle having a rear bolster of a bearing plate secured on said bolster, an attaching plate superimposed on the bearing plate, the attaching plate and the bearing plate having vertically alined openings, a vertical pivot pin disposed in said vertically alined openings in the attaching plate and the bearing plate, a rearward extension on said attaching plate intermediate the ends of the attaching plate, said rearward extension having an upstanding ear provided with a horizontal transverse opening, a reach pole having a transverse opening in the forward end portion thereof, and a horizontal pivot arm projecting through the openings in said upstanding ear and the horizontal opening in the forward end portion of the said reach pole for connecting the reach pole with said attaching plate so that said reach pole can swing vertically, a bunk superimposed on and secured to said attaching plate and pairs of upwardly extending lugs on the end portions of said attaching plate for embracing the lower edge portion of said bunk.

6. The combination with a vehicle having a rear bolster, of a bearing plate superimposed on said bolster, an attaching plate superimposed on the bearing plate, the attaching plate and the bearing plate having vertically alined openings, a vertical pivot pin disposed in said vertically alined openings in the attaching plate and the bearing plate, a rearward extension on said attaching plate intermediate the ends of the attaching plate, said rearward extension having an upstanding ear provided with a horizontal transverse opening, a reach pole having a transverse opening in the front end portion thereof, and a horizontal pivot arm projecting through the opening in said upstanding ear and the horizontal opening in the forward end portion of the said reach pole for connecting the reach pole with said attaching plate so that said reach pole can swing vertically, said bunk having a vertical opening in line with said vertical openings in the bearing plate and the attaching plate and said pivot pin extending through said vertical opening in the bunk and connecting the bunk with the attaching plate, and pairs of upwardly extending lugs on the end portions of said attaching plate for embracing the lower edge portion of said bunk, said attaching plate having other spaced upwardly extending portions for entering the cavities in the lower face of said bunk.

7. In combination, a reach pole having a body formed with the forward end portion thereof offset upwardly and having an attaching head section at the forward end thereof, said body of the reach pole being tubular, said attaching head section including a tubular portion adapted to fit in the forward end portion of the body of the reach pole, means securing the lapped portions of the body of the head section of the reach pole to each other, said attaching head section of the reach pole having a pair of forwardly and downwardly extending spaced ears, an attaching plate adapted to be connected with a rear body bolster of a vehicle to swing about a vertical axis, said attaching plate having a rearwardly extending portion intermediate its length formed with a pair of spaced upstanding ears, said ears of the attaching head section of the reach pole being adapted to be received between the ears of the rearward extension of the attaching plate and the ears of the head section of the reach pole when the ears of the rearward extension of the attaching plate having alined horizontal openings, a horizontal pivot arm extending through the alined openings of said ears for connecting the reach pole with the attaching plate to swing about a horizontal axis.

WILLIAM C. NABORS.